Patented Feb. 7, 1933

1,896,619

UNITED STATES PATENT OFFICE

ERNEST F. GRETHER, OF MIDLAND, MICHIGAN, ASSIGNOR TO THE DOW CHEMICAL COMPANY, OF MIDLAND, MICHIGAN, A CORPORATION OF MICHIGAN

METHOD OF OBTAINING ANTIPYRINE

No Drawing. Application filed January 29, 1930. Serial No. 424,457.

The present invention relates to the purification and/or isolation of antipyrine from reaction mixtures by distillation thereof with steam, particularly under reduced pressure, for example from impure antipyrine or aqueous liquors containing the same.

In the process heretofore employed for making antipyrine by methylating phenyl-methyl-pyrazolone by means of a methyl halide, the reaction product has been treated with an aqueous alkali to neutralize hydrogen halide therein, and then evapoarated to dryness. The residual dry mass was then extracted with a solvent such as chloroform to separate antipyrine from the admixed inorganic salts and the final product recovered from the extract by evaporation thereof. In another method, antipyrine was extracted from the reaction mixture, which had been rendered alkaline, by a solvent such as benzene and crystallized therefrom. The crude antipyrine obtained in either way was then recrystallized from benzene or water in conjunction with a decolorizing treatment by means of charcoal.

It is known that antipyrine can be distilled directly at high temperatures, e. g. at about 319° C. when under a reduced pressure corresponding to 174 millimeters of mercury. However, at least a partial decomposition of said material occurs at such temperatures. I have now found that antipyrine can be more conveniently distilled and at lower temperatures by means of steam and preferably under reduced pressure, whereby decomposition of the product is substantially eliminated, antipyrine then being separated from the vapors or distillate in any desired way. Such procedure thereby affords a useful means of purifying antipyrine or recovering the same from mixtures or solutions containing the same, more particularly aqueous solutions such as may be obtained in the methylation of phenyl-methyl-pyrazolone by either dimethyl sulfate or by a methyl halide.

My invention, then, consists of the improved method hereinafter fully described and particularly pointed out in the claims, the following description setting forth in detail several modes of carrying out the invention, such disclosed modes illustrating, however, but several ways in which the principle of my invention may be used.

In distilling antipyrine or aqueous mixtures or solutions containing the same, according to my improved method, the distilling vapors including antipyrine and steam, are preferably maintained at a temperature between about 115° and about 200° C., i. e. below a temperature at which substantial decomposition of the product occurs. Such temperature is controlled by adding sufficient heat to the material being distilled by means of the entering steam, by a bath under the still, by a heating coil in such material, or by other means. For instance, a current of steam is passed through crude antipyrine which has been previously heated to a temperature of about 125° C., and under a reduced pressure (about 80 millimeters), said steam containing sufficient heat to raise the temperature of the distilling vapors to about 150° C., whereby antipyrine is included in the distillate and may be recovered therefrom in any suitable way.

My invention may be adapted to the isolation of antipyrine from solutions or mixtures containing the same. For example, a reaction mixture obtained by methylating phenyl-methyl-pyrazolone by means of an alkyl halide in the presence of methyl alcohol, is treated with aqueous sodium carbonate to neutralize the hydrogen halide formed in the reaction, heated to remove excess alcohol, and then steam distilled as above described. Antipyrine is thereby vaporized, and included in the distilling vapors in amount sufficient to form an aqueous distillate containing about 5 to 6 per cent. of product dissolved therein. The water is then evaporated, for instance under reduced pressure, antipyrine remaining in the residual liquor and crystallizing therefrom in substantially pure form. The residual liquor, after separation of the crystalline product therefrom, may be returned to the original steam distillation step or otherwise treated to recover antipyrine therefrom.

If desired, antipyrine may be separated from the vapors by fractional condensation thereof. Moreover, my invention may be operated as a practically continuous method, for instance by adding antipyrine or material containing the same to the still at substantially the same rate at which such material distills.

The temperature and pressure at which the herein described distillation may be carried out may be varied considerably. For instance, I have found when the temperatures of the introduced steam and of the antipyrine in the distilling apparatus are adjusted so that the distilling vapors are between about 115 and 130° C., and the pressure of the system is about 80 millimeters, that the distillate contains approximately 2 to 4 per cent. antipyrine dissolved therein, and that when the vapors are between about 140 and 160° C., the concentration of product in the distillate is increased to about 5 to 6 per cent. The distillation may also be carried out at a temperature between about 160 and 180° C. without substantial decomposition, whereas some decomposition of product occurs at higher temperatures, particularly above about 200° C. Other degrees of reduced pressure may be employed for the purpose of accelerating the rate of distillation of the antipyrine, the steam consumption decreasing as the pressure becomes lower.

In carrying out my present invention, the steam used to remove vaporized antipyrine from the heated zone, may be replaced in whole or part by other gas or vapor substantially unreactive with antipyrine under the operating conditions. For instance, nitrogen may be passed through molten crude antipyrine, then through a cooler wherein the latter is separated therefrom, and the nitrogen then recycled under reduced pressure by means of a pump. In another procedure, molten crude antipyrine or a solution containing the same may be flowed countercurrently to steam or other inert gas in a suitable heated zone, such as a distillation column, whereby antipyrine may be vaporized and removed by means of the admixed vapors or gas at a suitable reduced pressure.

In its broad aspects, my invention involves separating antipyrine from admixed material by vaporizing in presence of a gas inert thereto, preferably under reduced pressure, such diluent being separable from the antipyrine and while maintaining the temperature of such vaporization below approximately 200° C. More specifically, my method involves distilling antipyrine with steam, preferably under reduced pressure, the product being recovered in substantially pure form from the distilling vapors or the distillate in any suitable way.

Other modes of applying the principle of my invention may be employed instead of those explained, change being made as regards the process herein described, provided the details stated by any of the following claims or the equivalent of such be employed.

I therefore particularly point out and distinctly claim as my invention:—

1. In a method of purifying antipyrine, the step which consists in vaporizing the same at a temperature between 115° and 200° C., in the presence of a gaseous diluent substantially inert thereto.

2. In a method of purifying antipyrine, the step which consists in vaporizing the same at a temperature between 115° and 200° C., at a pressure less than atmospheric, and in the presence of a gaseous diluent substantially inert thereto.

3. In a method of purifying antipyrine, the step which consists in vaporizing the same at a temperature between 115° and 200° C., at a pressure of approximately 80 millimeters and in the presence of a gaseous diluent substantially inert thereto.

4. In a method of purifying antipyrine, the step which consists in vaporizing antipyrine at a pressure less than atmospheric with steam, the distilling vapors being maintained at a temperature between 115° and 200° C.

5. In a method of purifying antipyrine, the steps which consist in distilling antipyrine with steam, the vapors being maintained at a temperature below about 200° C. and seperating the same from the distillate.

6. In a method of purifying antipyrine, the steps which consist in distilling antipyrine with steam at a pressure less than atmospheric while maintaining the vapors at a temperature below about 200° C., and separating antipyrine from the distillate.

7. In a method of purifying antipyrine, the steps which consist in distilling antipyrine at a pressure less than atmospheric with steam, the distilling vapors being maintained at a temperature below about 200° C., and separating antipyrine from the distillate.

8. In the manufacture of antipyrine, the steps which consist of treating the reaction product from methylating phenyl-methylpyrazolone with a substantially non-volatile basic compound, and then separating antipyrine from said reaction product by distilling same at a pressure less than atmospheric in a current of an unreactive gas, the distilling vapours being maintained at a temperature between 115° and 200° C.

9. In the manufacture of antipyrine, the steps which consist of treating the reaction product from methylating phenyl-methylpyrazolone with a substantially non-volatile basic compound and then separating antipyrine from said reaction product by distilling same at a pressure less than atmospheric with steam, the distilling vapours being maintained at a temperature between 115° and 200° C.

10. In the manufacture of antipyrine, the steps which consist of treating the reaction product from methylating phenyl-methyl-pyrazolone with a substantially non-volatile basic compound, and then separating antipyrine from said reaction product by distilling same at a pressure less than atmospheric with steam to separate antipyrine therefrom, the distilling vapours being maintained at a temperature between 115° and 200° C. and recovering antipyrine from the distillate.

Signed by me this 20th day of January, 1930.

ERNEST F. GRETHER.